Sept. 9, 1952            F. J. T. BARNES            2,609,984
SYSTEMS AND APPARATUS FOR STERILIZING CONTAINERS
AND FILLING THEM WITH A STERILIZED BEVERAGE
Filed Nov. 26, 1949            2 SHEETS—SHEET 2

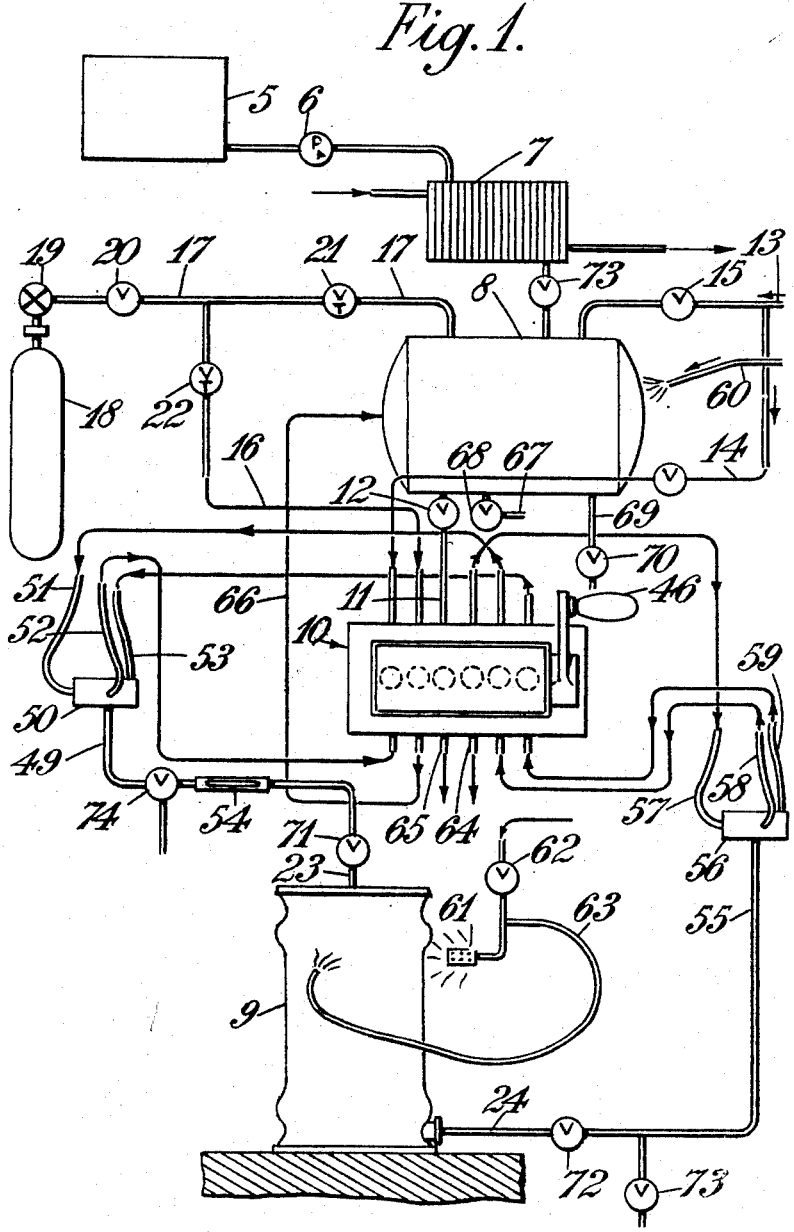

INVENTOR
FREDERICK J. T. BARNES by Wilkinson Mawhinney
Attys.

Patented Sept. 9, 1952

2,609,984

UNITED STATES PATENT OFFICE 2,609,984

SYSTEM AND APPARATUS FOR STERILIZING CONTAINERS AND FILLING THEM WITH A STERILIZED BEVERAGE

Frederick John Trevallon Barnes, Kingston-on-Thames, England

Application November 26, 1949, Serial No. 129,642
In Great Britain April 8, 1949

8 Claims. (Cl. 226—68)

1

This invention concerns apparatus for filling containers with beverage under sterilized conditions and relates, more particularly, to filling containers with beer, stout or the like. The present invention relates to apparatus of the kind in which a sterilized fluid is passed through the container and an inert gas is subsequently introduced to the container to expel the sterilizing fluid therefrom prior to the container being filled with beverage, the beverage-filling operation being performed while the gas is in the container.

Beer, stout or the like may be stored for some weeks in sterilized metal containers but if the beer is not sterilized prior to the containers being filled and is not passed to the containers along sterilized pipe lines, the keeping time is very limited. The present invention has for its object to provide an improved apparatus of the kind set forth whereby this may be done.

According to the present invention the apparatus is characterized in that the sterilizing fluid, inert gas, and beverage are selectively delivered to the container each by a pipe line incorporating a control valve and each pipe line connects with a closed beverage tank in which sufficient beverage is stored to fill a plurality of containers, the arrangement being that prior to the storage tank being filled with sterilized beverage, the sterilizing fluid and inert gas are passed through the storage tank, along that portion of each of said three pipe lines which extends from the storage tank to the container and through the container, said passage of fluid and gas being controlled by the valve associated with each pipe line.

A practical embodiment of the present invention will now be described, by way of example only, with reference to the accompanying drawings whereof—

Figure 1 is a schematic arrangement of a system in accordance with the present invention for filling metal containers with beer, and Figure 2 is an elevation, partly in section, of a valve means which forms a part of the arrangement of Figure 1, certain parts being shown in section.

Referring now to Figure 1, the unsterilized beer is contained in a tank 5 and is delivered therefrom by a pump 6 to a heat exchanger 7 and thence to a main storage tank 8, the flow from heat exchanger 7 to tank 8 being regulated by valve 75. The tank 8 holds sufficient beer to fill several of the metal containers 9. When the tank 8 has been emptied it is replenished from the storage tank 5. Beer supplied to the main tank

2

8 is sterilized in the heat exchanger 7. Prior to its delivery to the storage tank 5 the beer will have been carbonated, chilled and filtered. The heat exchanger 7 is of any convenient or known form but it is preferred that the beer passing through it be sterilized by steam. The steam is also delivered to the storage tanks and pipe along which the beer passes to the main tank 8 so that the beer delivered thereto is not contaminated.

Beer may be delivered to the storage tank 8 under a pressure head or under pressure by means of an inert gas, such as carbon dioxide, instead of by pump 6.

A valve assembly, generally indicated by the reference numeral 10, is connected with the tank 8 by a pipe 11. A valve 12 is provided in the pipe 11 for manual operation. The valve assembly 10 is also connected with a steam main 13 by pipe 14, steam being the preferred sterilizing fluid. The steam main is also connected with the tank 8, a manually operated valve 15 being provided to control the passage of steam to the tank. The assembly 10 is also connected by pipes 16, 17 with a cylinder 18 which contains carbon dioxide under pressure. The flow of carbon dioxide from the cylinder 18 is regulated by valves 19, 20. The pipe 17 also connects with the tank 8. A regulating valve 21 is provided to control the supply of carbon dioxide to the tank 8 and a valve 22 is provided to regulate the supply of carbon dioxide to the assembly 10.

The valve assembly 10 is also connected by pipe lines (as hereinafter described in detail) with the metal container 9 at 23 and 24. Normally 23 acts as an inlet to the container and 24 acts as an outlet, but, as will shortly appear, these roles are at times reversed. Nevertheless, for convenience, 23 will be referred to as the inlet and 24 as the outlet connections to the container 9.

The construction of the valve assembly 10 is shown in detail in Figure 2 to which reference will now be made.

The valve assembly comprises a base 25, six valves (indicated by the reference numerals 26–31 inclusive) and a valve-operating mechanism generally indicated at 32. Each valve 26–31 comprises a body 33, a poppet valve 34 seated therein and a spring 35 to maintain the valve closed. The stem 36 of the valve passes upwardly through the gland 37.

The valves are mounted side by side being secured to the base plate 25. The stems 36 are directed towards a camshaft 38 which carries, for each valve, a suitable cam 39. The camshaft is mounted in bearings 40 carried by the plate 25.

Secured to the shaft 38 is a disc 41 having a plurality of circumferentially-spaced indentations 42. The disc 41 constitutes one element of a ball and detent catch, the number of indentations 42 corresponding to the number of different positions to which the shaft is to be set. A ball element 43 is carried in the housing 44 and is urged by a spring 45 towards the disc 41. The number of indentations 42 corresponds to the number of different operating positions to which the shaft may be set.

The mechanism 32 comprises a handle 46 which is freely mounted on the shaft 38 and a pawl 47 carried by the handle. A ratchet 48 is secured to the shaft 38 and the arrangement is such that when handle 46 is swung downwardly against the plate 25 it will, through the pawl and ratchet, rotate the camshaft 38 from one set position to the next succeeding position. The camshaft is held in each position by the ball and detent catch. The handle 46 is returned to the normal position by a spring (not shown).

The inlet connection 23 communicates through a pipe 49 with a collector 50 (inlet collector) with which pipes 51, 52 and 53 also communicate. Similarly, the outlet connection 24 communicates through a pipe 55 with an outlet collector 56 and pipes 57, 58 and 59 also communicate with said collector. The pipes 51—53 and 57—59 connect with the valve assembly 10 as hereinafter described. The pipe connections to the valve assembly 10 are only diagrammatically shown in Figure 1 and are not properly related. Figure 2 shows the proper connections.

A cold water spray may be directed on to the tank 8 by means of the nozzle 60. A jet of cold water may also be directed on to the container 9 through the nozzle 61, the supply of cold water being controlled by valve 62. A flexible hose 63 may also be used for directing a stream of water on to the container 9.

The valve 26 of assembly 10 controls the passage of steam from the pipe 14 to the pipe 51 and thence to the inlet collector 50, and is therefore referred to as the steam-inlet valve. Valve 27 controls the passage of steam from the pipe 59 to an exhaust pipe 64—the steam-outlet valve. Valve 28 controls the passage of carbon dioxide from the pipe 16 to the pipe 53 and then to the inlet collector 50—the gas-inlet valve. Valve 29 controls the passage of carbon dioxide from the outlet collector 56 by way of pipe 58 to an exhaust pipe 65—the gas-outlet valve. Valve 30 controls the passage of beer from pipe 11 to pipe 57 and so to the outlet collector 56—the beer-inlet valve. Finally, the valve 31 controls the escape of forced gas from the container by the beer-filling operation, the gas passing through the inlet collector 50 and pipe 52 to a return pipe 66 which leads to the tank 8—the escape valve.

The steam valves, gas valves and beer valves are operated together in pairs being opened and closed at the same time by means of the cam mechanism described above. In the apparatus shown in Figure 1 the inlet connection 23 is at the top of the container 9 and the outlet connection 24 is at the bottom thereof. The present invention may be used, however, with a container having a single opening which receives a combined inlet and outlet connection by means of concentric pipes. With either arrangement the operations are generally as detailed below.

An outlet 67 is connected with the tank 8, the outlet being controlled by a valve 68. A further outlet 69 is provided which is controlled by a valve 70. The outlet 67 is a main outlet whilst the outlet 69 is provided to enable a restricted flow of fluid from the tank.

In operating the plant shown in Figure 1 two main steps are involved.

The first step is directed to ensuring that the tank 8, valve assembly 10, container 9 and all the pipes and valves connecting them together are sterilized. The second step consists in cleansing the system of sterilizing fluid and also of filling the container with sterile beer under sterile conditions.

The first step will now be set forth in detail.

First of all, the valve 15 is opened so that steam from pipe 13 passes to the main tank 8. The valve 70 is opened so that the steam entering the tank will pass from the pipe 69. The passage of steam is continued until the bottom of the tank 8 is hot and steam is exhausting from the pipe 69. The valve 70 is then shut. While valve 70 remains closed valves 21 and 22 are opened so that steam will pass from the tank 8 by pipes 17 and 16 to the valve assembly 10. The inlet 23 and the outlet 24 are connected to the container 9. Thereafter the valve assembly 10 is adjusted by mechanism 32 to open valves 26 and 27 so that steam from pipe 14 passes through valve 26, pipe 51, inlet collector 50 and pipe 49 to the inlet 23. The steam therefore enters the container 9 and is discharged through the outlet 24, pipe 55, collector 56, pipe 59, valve 27 and exhaust pipe 64. Steam is allowed to circulate in this way for about five minutes and will sterilise the various parts through which it passes. Thereafter the valve assembly 10 is again adjusted to close valves 26, 27, and, at the same time to open valves 28 and 29, and as a consequence steam passes from tank 8 through pipes 17, 16 the valve 28, pipe 53, collector 50, pipe 49 to the container 9 and is discharged therefrom by pipes 55, 58, valve 29 and pipe 65 to atmosphere. This circulation of steam is also maintained for about five minutes and is stopped when valves 71 and 72 are closed. Immediately after closure of valves 71, 72 the valve 73 is opened and the valve assembly 10 is adjusted to close valves 28, 29 to open the valves 30, 31. Steam then flows from the tank 8, through pipe 11 into valve 30 and then by pipe 57, collector 56 and pipe 55 to atmosphere through valve 73. This is continued for about five minutes. Thereafter the valve 74 is opened and this allows steam to pass along pipe 66 from the tank 8 to the valve assembly 10 through valve 31, pipe 52, collector 50 and pipe 49 and through the valve 74 to atmosphere. The steam is passed for about five minutes. Thereafter the valves 71, 72 are opened and valves 73 and 74 closed.

The second main step then follows.

The valve 20 is opened and adjusted so that the carbon dioxide gas is delivered from the cylinder 18 at a suitable pressure. Valve 15 is then shut. The tank 8 is allowed to cool, this being done, if necessary, by means of cold water from the nozzle 60. At the same time water is directed on to the container 9 from the nozzle 61 and by means of the hose pipe 63. While the tank 8 and the container 9 are being cooled, the supply of carbon dioxide is maintained and the valve assembly 10 is adjusted to open the valves 26—31 in turn as described above, so that carbon dioxide enters the tank 8, container 9 and the several pipe lines and drives the steam out. When this operation is completed, the sterilized pipe lines, container and storage tank are filled with the inert gas. The storage tank is then filled with sterilized beer, valve 75 being opened for this purpose.

Next the handle 46 is pulled downwardly to open the beer-valve 30 and escape valve 31, and as a consequence beer is delivered from the tank 8 to the collector 56 and thence to the outlet 24. The beer therefore enters the bottom of the container 9 and rises to fill it. As a consequence the beer drives out the carbon dioxide gas from the top of the container through the inlet 23, the inlet collector 50, pipe 52 and the escape valve 31. It is apparent that during the operation of filling the container 9 (valves 30, 31 being open) the gas pressure in tank 8 and container 9 is equalized and beer enters the container under a gravity head. If, however, valve 74 is opened, the pressure in container 9 is less than in tank 8 and beer enters the container under some pressure due to the inert gas in the tank. This provides for more rapid filling of the containers, and as during the operation, gas is being expelled through valve 74, atmospheric contamination of the system does not take place. A sight glass 54 in pipe 49 gives indication that the container has been filled and that the beer is passing through said pipe line. When the beer is seen in the sight glass 54 the handle 46 is pressed downwardly to close valves 30 and 31. The container is now full and inert gas in the container has been forced therefrom during filling and delivered to the top of the beer storage tank through pipe 66.

Finally, the handle 46 is again adjusted to return the camshaft 38 to its initial position when all the valves 26 to 31 are closed. The container 9 is now full of sterilized beer which has been delivered to the container through pipes, valves and associated parts which were sterilized at the same time as the container is sterilized.

The inlet and outlet pipes 23 and 24 respectively to the container 9 are then disconnected. These connections incorporate valves which automatically close as the pipes are being removed thereby ensuring that the contents of the container are not exposed to atmospheric contamination. Live steam is applied to the inlet and outlet connections of the container to ensure that these are sterilized and a suitable seal is affixed thereto.

The connections 23, 24 are made with a second container, the handle 46 is pulled down to open valves 26, 27 and steam enters the container at 23 for some minutes to sterilize it, the steam passing through pipes 49, 55 and expelling beer, remaining from the previous filling operation, from the pipes, through the assembly 10 so that the system and the new container are sterile. The mechanism 32 is again actuated and carbon dioxide enters container 9 to drive out steam and fill the container. When valves 30, 31 are opened by mechanism 32 the container is filled with beer from tank 8 and finally handle 46 is pulled down to close valves 30 and 31. This container is removed and replaced by another and the sequence of operations repeated.

It will be understood that the function of the valves of the assembly 10 may be interchanged to suit different pipe layouts. Thus, valves 26 and 31 may be steam inlet and outlet valves respectively.

I claim:

1. Apparatus for filling containers with beverage comprising a source of sterilizing fluid, a source of inert gas, a source of sterilized beverage, a closed beverage tank in which sufficient beverage is stored to fill a plurality of containers, means for delivering the sterilizing fluid, inert gas and sterilized beverage to the storage tank, a separate pipeline for delivering the sterilizing fluid, inert gas and beverage to a container each pipeline being connected with said storage tank, a control valve for each pipeline and common means for actuating said valves in sequence whereby, prior to the storage tank being filled with sterilized beverage, the sterilizing fluid and inert gas are passed through the storage tank, along that portion of each of said three pipelines which extends from the storage tank to the container and through the container.

2. Apparatus as claimed in claim 1 wherein there is provided valve means for controlling the passage of sterilizing fluid and inert gas to the container along the appropriate pipelines, a pipeline for conveying beverage from the storage tank to the container, valve means for controlling the passage of beverage along said pipeline and means for actuating said sterilizing-fluid valve means, gas-valve means and beverage valve means so that, firstly, sterilizing fluid and, secondly, inert gas is passed through the appropriate valve means from the storage tank to the container along the gas pipeline, along the fluid pipeline and along the beer pipeline whereby all these parts are sterilized and filled with inert gas prior to filling the storage tank.

3. Apparatus as claimed in claim 2 wherein each of said three valve means comprises a pair of valves of which one controls the passage of fluid, gas or beverage to the container and the other the escape of fluid, gas or beverage from the container after passing therethrough.

4. Apparatus as claimed in claim 3 in which the return beverage line incorporates a branch pipe and there is a valve to place the return pipe in communication with the container or the container in communication with atmosphere.

5. Apparatus as claimed in claim 4 wherein the fluid and gas are supplied to the top of the container and the beverage is supplied to the bottom of the container.

6. Apparatus as claimed in claim 5 wherein said valves are arranged in line, each comprises a spring-closed poppet-valve and the valve actuator comprises a shaft common to the valves and carrying an operating cam for each valve.

7. Apparatus as claimed in claim 6 in which the cam shaft is manually operated through the agency of a pawl and ratchet drive, the shaft being rotated by the same amount at each operation to actuate the valves by the cam in a predetermined order.

8. Apparatus as claimed in claim 7 wherein a single supply and return pipe is provided for connection to the container and each such pipe communicates with a collector with which the supply and return pipelines for fluid, gas and beverage communicate.

FREDERICK JOHN TREVALLON BARNES.

REFERENCES CITED

The following references are of record in the file of this patent:

UNITED STATES PATENTS

| Number | Name | Date |
| --- | --- | --- |
| 2,210,017 | Wetherly-Williams et al. | Aug. 6, 1940 |
| 2,421,708 | McKinnis | June 3, 1947 |